(12) United States Patent
Lee et al.

(10) Patent No.: US 8,834,219 B2
(45) Date of Patent: Sep. 16, 2014

(54) FLOATING STRUCTURE WITH FUEL TANK FOR GAS FUEL

(75) Inventors: Sung Jun Lee, Geoje-si (KR); Yoon Chul Byun, Geoje-si (KR); Won Joon Lee, Geoje-si (KR)

(73) Assignee: Daewoo Shipbuilding & Marine Engineering Co., Ltd., Seoul (KR)

( * ) Notice: Subject to any disclaimer, the term of this patent is extended or adjusted under 35 U.S.C. 154(b) by 0 days.

(21) Appl. No.: 13/502,359

(22) PCT Filed: Oct. 5, 2010

(86) PCT No.: PCT/KR2010/006786
§ 371 (c)(1),
(2), (4) Date: Jun. 5, 2012

(87) PCT Pub. No.: WO2011/046313
PCT Pub. Date: Apr. 21, 2011

(65) Prior Publication Data
US 2012/0238161 A1    Sep. 20, 2012

(30) Foreign Application Priority Data
Oct. 16, 2009  (KR) .................. 10-2009-0098984

(51) Int. Cl.
| | |
|---|---|
| F02M 37/00 | (2006.01) |
| B63B 25/16 | (2006.01) |
| B63B 11/00 | (2006.01) |
| B63B 17/00 | (2006.01) |
| B63H 21/14 | (2006.01) |
| B63J 99/00 | (2009.01) |

(52) U.S. Cl.
CPC ............. B63B 25/16 (2013.01); B63B 11/00 (2013.01); B63B 17/0027 (2013.01); B63H 21/14 (2013.01); Y02T 70/5218 (2013.01); B63J 99/00 (2013.01)

USPC .............. 440/88 F; 114/74 R; 114/74 A (58) Field of Classification Search
USPC ................. 440/88 F; 114/72–74 R
See application file for complete search history.

(56) References Cited

U.S. PATENT DOCUMENTS 4,135,465 A *  1/1979  Dudley et al. ............... 114/74 A
5,687,665 A * 11/1997  Warkman .................... 114/74 R
(Continued)

FOREIGN PATENT DOCUMENTS

| EP | 2072885 A1 | 6/2009 |
|---|---|---|
| FR | 2876981 A1 | 4/2006 |

(Continued)

OTHER PUBLICATIONS

International Search Report dated Jun. 15, 2011 of PCT/KR2010/006786 which is the parent application—4 pages.

(Continued)

*Primary Examiner* — Lars A Olson
*Assistant Examiner* — Jovon Hayes
(74) *Attorney, Agent, or Firm* — Knobbe Martens Olson & Bear LLP (57) ABSTRACT

Disclosed herein is a floating structure with a fuel gas tank for storing gas fuel to be fed to a dual fuel propulsion system under a cabin area. According to the present invention, there is provided a floating structure with a fuel gas tank storing gaseous fuel used as fuel while floating at sea, including: a cabin area disposed on an upper deck of the floating structure; a fuel gas tank mounted under the cabin area in the hull of the floating structure; and a blocking member mounted between the cabin area and the fuel gas tank to secure safety of the cabin area.

14 Claims, 4 Drawing Sheets

(56) References Cited

U.S. PATENT DOCUMENTS

| | | | | |
|---|---|---|---|---|
| 5,839,383 | A * | 11/1998 | Stenning et al. | 114/72 |
| 6,076,480 | A * | 6/2000 | Chang et al. | 114/125 |
| 6,135,044 | A * | 10/2000 | Nielsen | 114/74 R |
| 6,237,347 | B1 * | 5/2001 | Rigby et al. | 62/48.1 |
| 6,899,046 | B2 * | 5/2005 | Searle et al. | 114/74 R |
| 6,966,272 | B2 * | 11/2005 | Freelund et al. | 114/73 |
| 7,240,499 | B1 * | 7/2007 | Shivers, III | 62/53.2 |
| 8,028,724 | B2 * | 10/2011 | Lee et al. | 141/11 |
| 2006/0086412 | A1 | 4/2006 | Spittael et al. | |
| 2008/0308175 | A1 * | 12/2008 | Lee et al. | 141/11 |
| 2012/0244762 | A1 * | 9/2012 | Lee et al. | 440/88 F |

FOREIGN PATENT DOCUMENTS

| | | |
|---|---|---|
| GB | 981017 A | 1/1965 |
| JP | 06-156365 A | 6/1994 |
| JP | 2006-248257 A | 9/2006 |
| JP | 2006-300319 A | 11/2006 |
| JP | 2006-300320 A | 11/2006 |
| JP | 2008-105447 A | 5/2008 |
| KR | 10-2009-0010614 A | 1/2009 |
| KR | 10-2009-0018868 A | 2/2009 |
| KR | 20090098387 A | 9/2009 |
| WO | 2008/000898 A1 | 1/2008 |
| WO | 2008/075882 A1 | 6/2008 |

OTHER PUBLICATIONS

Extended European Search Report in Europe dated Mar. 26, 2014 of corresponding European Patent Application No. 10765923.7—10 pages.

Written Opinion and Search Report dated Jul. 1, 2013 of corresponding Singapore Patent Application No. 201202778-5—10 pages.

Japanese Office Action dated Aug. 20, 2013 of corresponding Japanese Patent Application No. 2012-534096—2 pages.

* cited by examiner

FLOATING STRUCTURE WITH FUEL TANK FOR GAS FUEL

TECHNICAL FIELD

The present invention relates to a floating structure with a fuel gas tank, and more particularly, to a floating structure with a fuel gas tank for storing a gaseous fuel fed to a dual fuel propulsion system disposed under a cabin area.

BACKGROUND ART

Generally, various ships such as a bulk carrier, a container ship, a passenger ship, or the like, have employed a fuel supply system using heavy oil (HFO or MDO) for example, bunker C oil, which is a liquid fuel, as propulsion fuel.

In the existing fuel supply system, if heavy oil, or the like, used as fuel combusts, the results from the combustion causes serious environmental pollution due to various harmful substances included in the exhaust gas. Since a demand for preventing environmental pollution is increasingly regulated throughout the whole world, regulations for a propulsion apparatus using heavy oil as fuel oil have correspondingly been reinforced. As a result, costs have been increasingly increased in order to meet these regulations.

In addition, when oil prices have considerably increased due to factors such as depletion of fossil fuel, localized unrest, or the like, several operational problems such as the rapid increase of fuel expenses of a ship using heavy oil as fuel, etc., are caused.

Therefore, research into a fuel supply system, etc., using clean fuel such as LNG (or, LPG, CNG, DME, etc.), that is a liquefied or gaseous fuel without using heavy oil (or, MDO) or using the minimum amount of heavy oil as fuel oil for various ships, but mainly using LNG (or, LPG, CNG, DME, etc.) as fuel when heavy oil (or MDO) becomes expensive or standards required for environmental protection are increased, and only use heavy oil (or, MDO) when heavy oil (or MDO) is cheap or environmental standards are less restricted has been continuously conducted.

DISCLOSURE

Technical Problem

The present invention has been made in an effort to provide a floating structure with a fuel gas tank having advantages of efficiently using a space by disposing a fuel gas tank for storing a gaseous fuel to be fed to a dual fuel propulsion system disposed under a cabin area.

Advantageous Effects

According to the present invention, the floating structure with the fuel gas tank for storing a gaseous fuel supplied to the dual fuel propulsion system disposed under the cabin area is provided.

As a result, according to the floating structure and according to the present invention, it is possible to efficiently use the space in the hull and over the upper deck.

<DESCRIPTION OF THE SYMBOLS IN MAIN PORTIONS OF THE DRAWINGS>

| | |
|---|---|
| 1: hull | 1a: bow portion |
| 1b: stern portion | 1c: additional hull portion |
| 1d: opening | 3: fuel tank for liquid fuel |
| 4: fuel gas tank | 5: propulsion apparatus |
| 7: storage tank | 9: removable fuel tank |
| 101a: upper deck | 102: cabin area |
| 104: fuel tank | 105: propulsion apparatus |
| 106: engine room | 108: machine room |
| 114: freight loading area | 115: freight |
| 116: coffer dam | 118: barrier rib |

BEST MODE

According to an aspect of the present invention, there is provided a floating structure with a fuel gas tank storing a gaseous fuel used as fuel while floating at sea. The floating structure with the fuel gas tank includes: a cabin area disposed on an upper deck of the floating structure; a fuel gas tank disposed under the cabin area in the hull of the floating structure; and a blocking member disposed between the cabin area and the fuel gas tank to secure the safety of the cabin area.

The blocking member may be a coffer dam formed to have a void space between a pair of bulk heads.

The blocking member may be a barrier rib capable of blocking heat and gas generated during a fire.

The barrier rib may be disposed between the coffer dam and the cabin area to be able to block heat and gas generated during a fire.

A machine room for treating fuel stored in the fuel gas tank may be disposed over the fuel gas tank and the coffer dam may be disposed between the machine room and the cabin area.

The barrier rib may be disposed between the coffer dam and the cabin area to be able to block heat and gas generated during a fire.

The machine room for treating fuel stored in the fuel gas tank may be disposed over the fuel gas tank and the barrier rib may be disposed between the machine room and the cabin area.

The fuel stored in the fuel gas tank may be a liquefied gas and the machine room may include at least one of a re-condenser, a pump, a cooler, a vaporizer, and a boil off gas compressor for treating the liquefied gas to be used in a propulsion apparatus or a power generation apparatus.

The floating structure may further include a propulsion apparatus using a gaseous fuel stored in the fuel gas tank as fuel.

The propulsion apparatus may be a high pressure gas injection engine or a low pressure gas injection engine capable of generating power using dual fuel. In addition, the propulsion apparatus may be a gas turbine.

The fuel gas tank may be removed from the hull. The floating structure may further include the fuel tank for liquid fuel stored to use at least one of heavy oil and diesel oil as fuel.

The fuel gas tank may be an independent tank capable of storing a liquefied gas.

The floating structure may be a ship that can be voyaged under one's own power by the propulsion apparatus, wherein the ship may be a container ship.

According to another aspect of the present invention, there is provided a floating structure with a fuel gas tank storing a gaseous fuel used as fuel while floating at sea. The floating structure with the fuel gas tank includes: a cabin area disposed on an upper deck of the floating structure; a fuel gas tank disposed under the cabin area in the hull of the floating structure; and a coffer dam disposed between the cabin area and the fuel gas tank and a barrier rib capable of blocking heat and gas generated during a fire, in order to secure the safety of the cabin area.

A space other than the cabin area on the upper deck of the floating structure may be a freight loading space capable of loading freights.

According to another aspect of the present invention, there is provided a ship with a fuel gas tank storing a gaseous fuel used as fuel while floating at sea. The ship includes: a cabin area disposed on an upper deck of the ship; a fuel gas tank disposed under the cabin area in the hull of the ship; and a blocking member disposed between the cabin area and the fuel gas tank to secure the safety of the cabin area, and a propulsion apparatus generating propulsive force using a gaseous fuel stored in the fuel gas tank as fuel.

MODE FOR INVENTION

Hereinafter, a floating structure having a dual fuel propulsion system according to an exemplary embodiment of the present invention will be described in detail with reference to the accompanying drawings.

FIGS. 1 to 4 are a schematic side view of a floating structure with a dual fuel propulsion system according to various exemplary embodiments.

Figure 1:
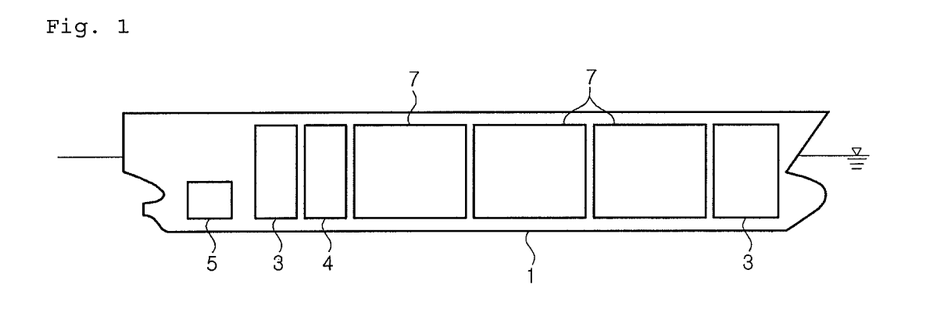
FIG. 1 is a side cross-sectional view schematically showing a floating structure with a dual fuel propulsion system according to an exemplary embodiment of the present invention.

As shown in FIG. 1, a floating structure having a dual fuel propulsion system includes a plurality of fuel tanks 3 and 4 for storing fuel in a hull 1 and a propulsion apparatus 5 generating propulsive force by fuel fed from the fuel tanks 3 and 4.

The dual fuel propulsion system may be configured to include the above-mentioned plurality of fuel tanks 3 and 4 and propulsion apparatus 5 and a pipe capable of feeding fuel received in each of the fuel tanks 3 and 4 to the propulsion apparatus 5.

The floating structure used herein implies a marine plant such as oil FPSO while floating anywhere at sea at normal times, in addition to various ships such as a bulk carrier, a container ship, a passenger ship, or the like.

As shown in FIG. 1, when the floating structure is a bulk carrier, a liquid cargo carrier, etc., it may include at least one storage tank 7 capable of storing freights in addition to the fuel tanks 3 and 4. The storage tanks 7 may also receive freights usable as fuel. In this case, it is to be noted that it is different from fuel stored in the fuel tank in the specification since it is handled as freight, not fuel.

According to the exemplary embodiment, a liquefied fuel such as heavy oil (HFO) or diesel oil (MDO), etc., generally widely used as fuel for the propulsion apparatus may be stored in a part of the fuel tanks 3 and 4 (i.e., a fuel tank 3 for liquid fuel) and any one of the gaseous fuels such as LPG, LNG, DME, CNG, or the like, may be stored in the remaining fuel tank (i.e., a fuel tank 4 for fuel gas).

The liquid fuel and gaseous fuel used herein are determined according to whether fuel fed to the propulsion apparatus, that is, the engine is liquid or gas. This means fuel such as heavy oil, diesel oil, etc., maintaining a liquid state when being fed to the propulsion apparatus is referred to as a liquid fuel and fuel such as LNG, LPG, DME, CNG, or the like, fed as a gas state when being fed to the propulsion apparatus even though a liquid state or a gas state is present when being stored in the fuel tank is referred to as gas fuel.

Generally, as fuel other than heavy oil, it is preferable to use fuel gas containing hydrocarbon components, such as LNG, LPG, CNG, or the like.

LNG, i.e., liquefied natural gas is generated by liquefying natural gas collected from a gas field, wherein the main component of the liquefied natural gas is methane. LNG is advantageous in respects to space efficiency because its volume can be reduced to approximately 1/600 when being liquefied by lowering the temperature or applying pressure, but should be charged in a specifically insulated tank or container to keep temperature at a boiling point or less during transportation and storage, since it has a low boiling point of approximately −162° C.

LPG, i.e., liquefied petroleum gas is generated by cooling and liquefying heavy hydrocarbon (two or more carbon atoms) component generated at the time of collecting crude oil from an oil field or purifying crude oil or heavy hydrocarbon component collected together at the time of collecting natural gas at a relatively low pressure (6~7 $kg/cm^2$). LPG is advantageous in terms of storage and transportation because the volume thereof is reduced to approximately 1/250 at the time of liquefying, wherein the main component thereof is propane and butane and may include a small amount of ethane, propylene, butylene, or the like.

CNG, i.e., compressed natural gas is generated by compressing natural gas at approximately 20 MPa to use the natural gas as fuel.

DME, i.e., dimethyl ether is a kind of ether and has lower flammability than LPG and less toxicity, and has a small environmental effect since a small amount of exhaust fume is generated during combustion due to high oxygen concentration.

Each of the fuel tanks 3 and 4 includes an appropriate insulation system and sealing system according to a type of fuel to be received. In particular, an example of the fuel tank receiving liquefying gas such as LNG, LPG, or the like, may include a membrane type tank or an independent type tank that has been used in the liquefying gas storage tank field.

Although FIG. 1 shows that both the fuel tank 3 for liquid fuel and the fuel gas tank 4 (for example, LNG, LPG, DME, CNG, or the like) are mounted in the hull 1 of the floating structure, the fuel tank 3 for liquefied fuel may be modified to be mounted in the hull 1 of the floating structure and the fuel gas tank 4 may be modified to be mounted on the deck of the floating structure. In addition, the fuel gas tank 4 may be modified to be mounted in the hull 1 of the floating structure and the fuel tank 3 for liquid fuel may be modified to be mounted on the deck of the floating structure.

Meanwhile, an example of the propulsion apparatus 5 may include a low pressure gas injection engine such as, for example, dual fuel diesel electric (DFDE), a high pressure gas injection engine such as, for example, ME-GI (Gas Injection Engine available from Man B&W Co.), and a gas turbine, or the like. If the propulsion apparatus uses at least two types of fuels as fuel, any propulsion apparatus may be used.

In the specification, the meanings "capable of using at least two types of fuels" include a concept of using a mixture of at least two types of fuels and a concept of selectively using at least one of two or more types of fuels, if necessary, while using at least the two types of fuel.

Figure 3:
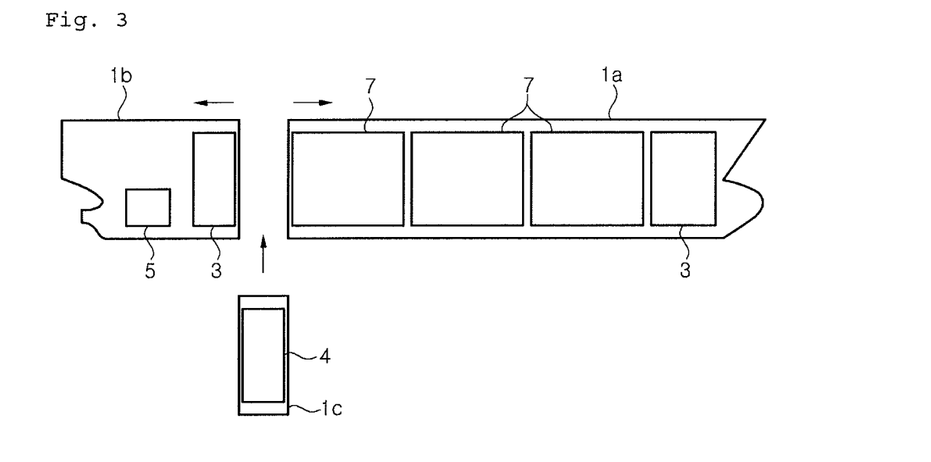
FIG. 3 is a diagram for explaining a method for additionally mounting another type of fuel tank in a floating structure designed and built to have only one type of a fuel tank.

FIG. 3 shows a diagram for explaining a method for additionally mounting the fuel gas tank 4 such as, different kind, for example, LNG, etc., in the floating structure designed and built to have, for example, only a fuel liquid tank 3.

According to the method shown in FIG. 3, the hull of the floating structure is separated into two portions, that is, a bow portion 1a and a stern portion 1b by being divided at any position. An additional hull portion 1c having the fuel gas tank 4 embedded therein is inserted between the bow portion 1a and the stern portion 1b and is integrated into one hull by welding.

Figure 2:
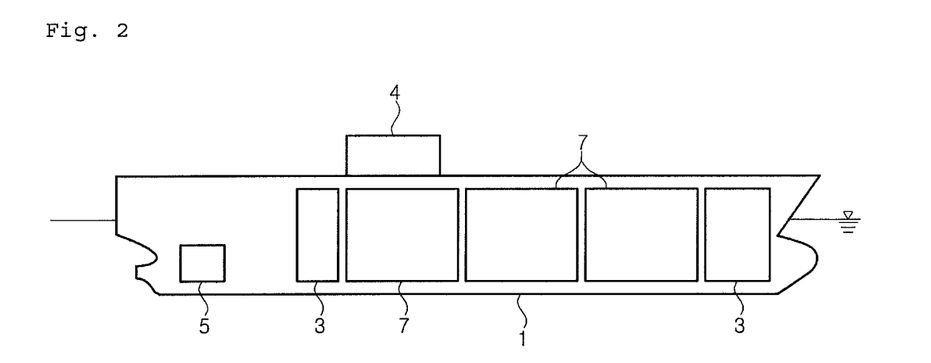
FIG. 2 is a side cross-sectional view schematically showing a floating structure with a dual fuel propulsion system according to another exemplary embodiment of the present invention.

According to the present invention, a method for additionally mounting the fuel tank in the hull as shown in FIG. 3 as well as a method for additionally mounting the fuel tank on the deck of floating structure as shown in FIG. 2 may be used.

Figure 4:
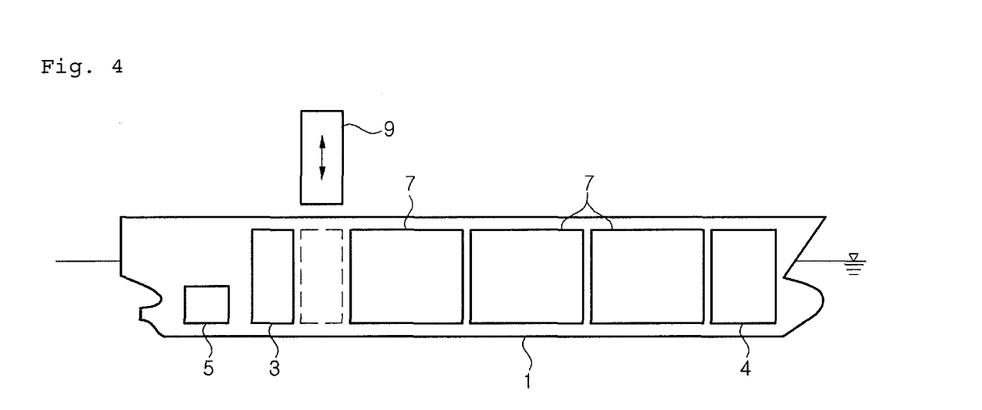
FIG. 4 is a side cross-sectional view schematically showing a floating structure with a dual fuel propulsion system according to another exemplary embodiment of the present invention.

When the plurality of fuel tanks 3 and 4 capable of storing two or more kinds of fuels from the initial design are mounted in the hull 1 as shown in FIG. 1 or when the fuel gas tank 4 capable of storing different kind of fuel is added to the hull 1 as shown in FIG. 3, these fuel tanks 3 and 4 may be configured to permanently attach to the hull 1 and may be configured to be removed, if necessary, as shown in FIG. 4.

As shown in FIG. 4, when the removable fuel tank 9 is provided, the fuel tank capable of storing fuel, that is more widely used, may be selectively mounted in consideration of the usage of fuel. As factors of determining the usage of fuel, it may depend on the kind of propulsion apparatus, the price of fuel, season, and environmental factor, or the like.

For example, the fuel tank 3 for liquefied fuel such as heavy oil and the fuel gas tank 4 such as LNG, etc., are each installed in the hull 1 of the floating structure and the removable fuel tank 9 as the fuel tank for liquid fuel is additionally mounted in the hull of the floating structure if it is expected that the usage of liquid fuel among these fuels will be increased and the removable fuel tank 9 as the fuel gas tank may be additionally mounted if it is expected that the usage of the gas fuel will be increased.

In addition, when the amount of the fuel is small, the removable fuel tank 9 is removed and the empty space in the hull formed thereby may be used as a space for loading freight.

For example, since the gaseous fuel such as LNG, or the like, has density lower than the liquid fuel such as HFO, etc., the removable fuel tank 9 is removed when only the liquid fuel having relatively higher density is used and the space in the hull formed thereby is used as a freight loading space, etc., and then, when the gaseous fuel is mainly used, the fuel gas tank as the removable fuel tank 9 may be used by being mounted therein.

Figure 5:
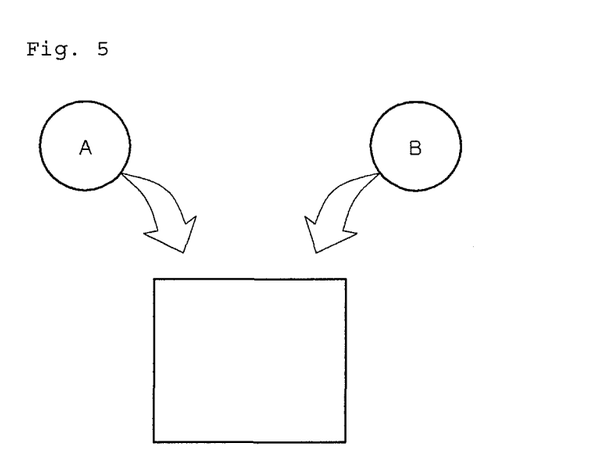
FIG. 5 is a diagram for explaining a concept selectively receiving different types of fuel in the same space according to the present invention.

In addition, according to the present invention, it may be configured to store different kinds of fuels in one space, for example, one fuel tank 3 or 4, if necessary, as shown in FIG. 5. For example, LNG or LPG may be selectively stored in the same space, if necessary, and heavy oil or diesel oil may be selectively stored in the same space, if necessary.

As such, according to the present invention, different kinds of fuel tanks may be selectively received in one space as shown in FIG. 4 and different kinds of fuels may be selectively received in the same space as shown in FIG. 5.

Hereinafter, an example when the dual fuel propulsion system is mounted as the propulsion apparatus and the present invention is applied to a container ship having the fuel gas tank for storing gaseous fuel to be fed to the dual fuel propulsion system will be described with reference to FIGS. 6 to 9.

Figure 6:
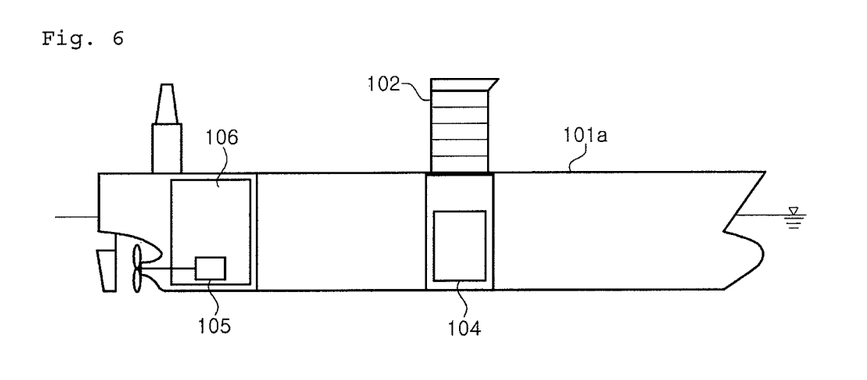
FIG. 6 is a side view schematically showing a floating structure when a fuel gas tank is disposed under a cabin area.
Figure 7:
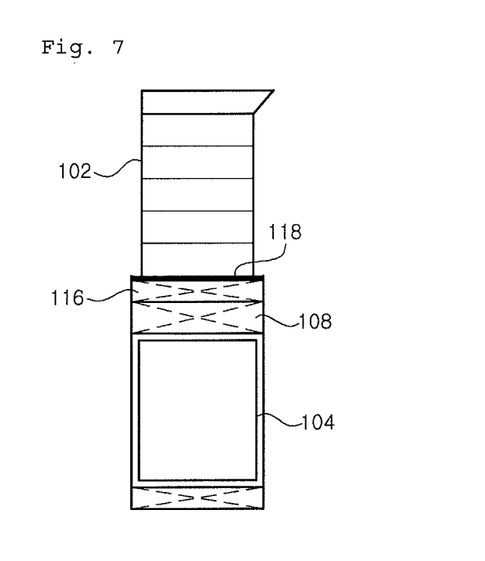
FIG. 7 is a magnified view of a major part of FIG. 6.
Figure 8:
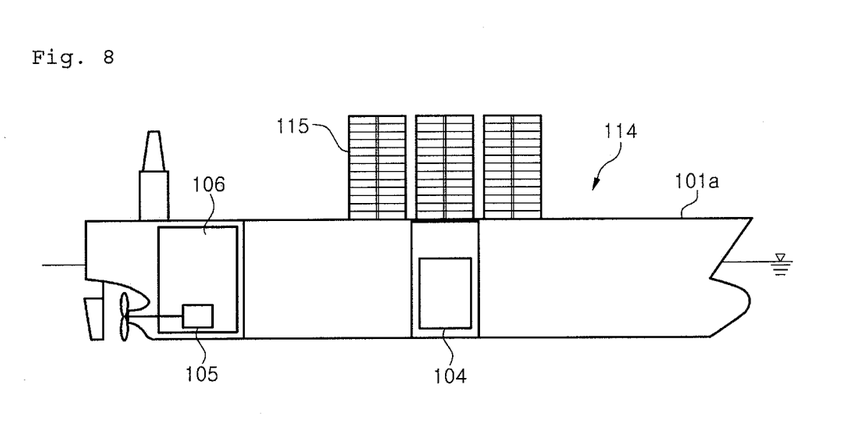
FIG. 8 is a side view schematically showing a floating structure when a fuel gas tank is disposed under a freight loading area.

FIG. 6 is a side view for schematically showing the floating structure, i.e., the container ship when the fuel gas tank is mounted under the cabin area and FIG. 7 is a magnified view of the main parts of FIG. 6. FIG. 8 is a side view for schematically showing the floating structure, i.e., the container ship when the fuel gas tank is mounted under the freight loading area and FIG. 9 is a magnified view of the main parts of FIG. 8.

In the container ship, a plurality of containers are loaded in the hull and on a upper deck 101a other than a cabin area 102 in which crewmen reside, an engine room 106 in which the propulsion apparatus 105 is mounted, a space in which the LNG fuel tank 104 is mounted, a machine room 108, or the like. When the size of the container ship is large, it is preferable to move from the stern of the cabin area 102 to the central portion of the hull to secure the field of view. As a result, the lower space of the cabin area 102, which is difficult to load containers, is used as a space where the LNG fuel tank 104 is disposed, in order to efficiently use the space. In the specification, the central portion of the hull implies a portion in front of the bow of the hull in which the propulsion apparatus 105 is mounted and does not necessarily imply the central portion of the length direction of the hull.

The inventors propose a method for using liquefied gas such as LNG (or LPG, DME), etc., as fuel of the propulsion apparatus for propelling a cargo ship such as a container ship, in order to meet the price increase of liquid fuel, such as heavy oil or diesel oil, etc., while avoiding the increasingly reinforced environmental regulations. To this end, as the propulsion apparatus, the dual fuel propulsion system, such as the high pressure gas injection engine such as ME-GI and the low pressure gas injection engine such as DFDE capable of using the dual fuel as fuel, etc., is used.

Figure 9:
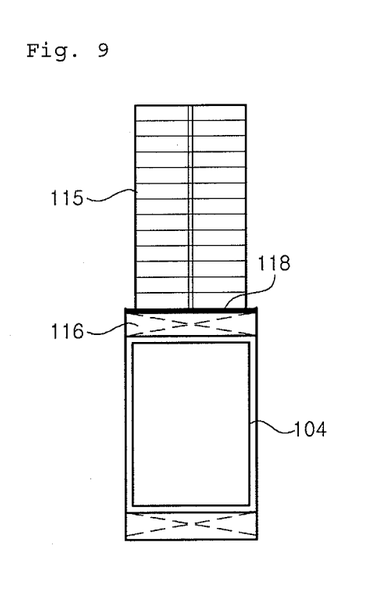
FIG. 9 is a magnified view of major parts of FIG. 8.

FIGS. 6 and 7 show that the ME-GI is used as the propulsion apparatus 105 and the LNG fuel tank 104 as the fuel gas tank is mounted under the cabin area 102 and FIGS. 8 and 9 show that the ME-GI is used as the propulsion apparatus 105 and the LNG fuel tank 104 as the fuel gas tank is installed under the freight loading area 114, but the present invention is not limited thereto. The heavy oil fuel tank as the fuel tank for liquid fuel for storing heavy oil to be used as fuel together with LNG in the propulsion apparatus 105 may be mounted under the cabin area 102, together with the LNG fuel tank 104 and may also be mounted in the hull.

According to the present invention, at least one of the LNG fuel tank and the heavy oil fuel tank may be removed from the hull and may be replaced with other kinds of fuel tanks. In addition, according to the present invention, the number of LNG fuel tanks and the number of heavy oil fuel tanks mounted in the hull may be controlled according to the usage of fuel.

The membrane type tank or the independent type tank may be used as the LNG fuel tank 104, in particular, an IMO type B tank may be used. That is, in order for the LNG fuel tank 104 to be removed from the inside of the hull, it is preferable to use the independent type tank. Among various kinds of independent tanks, the IMO type B tank where the hull protecting member is mounted below the tank (between the tank and the floor inside the hull) as a secondary barrier is preferably used.

Various apparatuses for feeding fuel to the dual fuel propulsion system (gas injection engine) as the propulsion apparatus 105 are preferably disposed in the machine room 108 disposed over the LNG fuel tank 104. As the fuel feeding apparatus for supplying LNG to the engine as fuel, there are the re-condenser, the high pressure pump, the cooler, the high pressure vaporizer, the boil off gas compressor, or the like.

When the liquefied gas in the extremely low temperature state is used as fuel, proper insulation is required for the fuel feeding apparatus, such that it is preferable that the LNG fuel tank 104 as the fuel tank and the machine room 108 are maximally close to each other. The increased distance between the LNG fuel tank 104 and the machine room 108 is not preferable, since heat loss is increased in view of the insulation aspect for the transferring pipe for LNG transfer.

Further, as shown in FIG. 7, the machine room 108 is preferably disposed between the LNG fuel tank 104 and the cabin area 102. As described above, since it is difficult to load freights 115 such as a container, etc., under the cabin area 102, it is preferable to use this space as a space where the LNG fuel tank 104 will be disposed. Further, since it is preferable that the machine room 108 is close to the LNG fuel tank 104, it is preferable to dispose the machine room 108 over the LNG fuel tank 104 while being disposed under the cabin area 102.

Further, it is preferable in terms of maintenance to dispose the machine room 108 between the cabin area 102 and the LNG fuel tank 104.

In order to feed the LNG as fuel stored in the LNG fuel tank 104 to the ME-GI engine as the propulsion apparatus 105, the LNG is fed to the propulsion apparatus 105 through the machine room 108. In this case, in order to feed the LNG as fuel from the machine room 108 to the propulsion apparatus 105, a fuel feeding pipe may be mounted under the hull or at the side thereof.

The LNG fuel tank 104 and the machine room 108 are classified as a risk area and the cabin area 102 disposed on the upper deck 101*a* is classified as a safety area. Therefore, when fire or leakage of fuel, i.e., LNG occurs in the LNG fuel tank 104 or the machine room 108 that is a risk area, there is a need to secure the safety of crewmen, passengers, or freights by blocking the safety area from the risk area.

To this end, according to the present invention, a coffer dam 116 is formed over the machine room 108 and the deck between the coffer dam 116 and the cabin area 102 is formed of a barrier rib capable of blocking heat and gas, such as, for example, an A-60 barrier rib 118, etc., when fire occurs. The coffer dam 116 and the barrier rib 118 may serve as a blocking member for safety.

FIGS. 7 and 9 show the A-60 barrier rib 118 as a barrier rib capable of blocking heat and gas, but the present invention is not limited thereto. Any barrier rib may be used if it can block heat and gas when fire occurs.

Meanwhile, the bottom of the LNG fuel tank 104, i.e., the floor of the hull is formed of a duplication floor.

The coffer dam 116 implies a structure where an empty space between a pair of bulk heads (barrier rib), that is, a void space is formed. In addition, the A-60 barrier rib 118 implies a barrier rib (formed by single gas tight bulkhead of all-welled construction) securing insulation and gas cutoff for 60 minutes when fire occurs.

The coffer dam 116 and the barrier rib 118 may be used to partition between the freight loading area 114 and the LNG fuel tank 104 as shown in FIGS. 8 and 9. Although FIG. 9 shows that the machine room 108 is omitted and the coffer dam 116 is disposed over the LNG fuel tank 104, the machine room 108 may be disposed between the LNG fuel tank 104 and the coffer dam 116 as shown in FIG. 7.

At least two LNG fuel tanks 104 may be disposed in parallel according to a width direction of the hull and the length of the LNG fuel tank 104 may have a dimension approximately corresponding to a container of a length of 40 ft as shown in FIG. 9.

According to the present invention, the LNG fuel tank 104 may be removably mounted from the hull and may store the gaseous fuel such as LPG, CNG, DME, etc., in addition to LNG. In addition, the fuel tank for liquid fuel storing liquid fuel such as heavy oil or diesel oil, etc., is mounted in parallel with the LNG fuel tank 104 in left or right or front and back directions and may be installed in a separate place in the hull.

Although the example where the fuel tank for two different fuels is mounted in the floating structure is described above, the present invention may mount the fuel tank for at least three different fuels.

Although the price and efficiency for each fuel may change according to times and several factors, the present invention may be used for propulsion by selectively employing the most efficient fuel at the present time. In addition, when the development of an electric propulsion system or a solar thermal system or a wind power generation system having excellent efficiency is completed in a short period of time, the present invention may configure a multi fuel propulsion system using the system.

In addition, although the example where the fuel from the fuel tank is fed to the propulsion apparatus configured of the gas injection engine such as the ME-GI engine or the DFDE engine, or the like, is described, the fuel may be fed to the gas turbine, etc., in addition to the above-mentioned engines for power generation.

As described above, although the floating structure with the fuel gas tank according to the present invention is described with reference to the accompanying drawings, the present invention is not limited to the above exemplary embodiments and drawings and thus, may be variously modified and changed by those skilled in the art to which the present invention pertains.

The invention claimed is:

1. A floating structure comprising:
a cabin structure disposed over an upper deck of the floating structure;
a fuel tank mounted in a hull of the floating structure below the upper deck and; and
a coffer dam comprising a void space, which is interposed between the cabin structure and the fuel tank such that the cabin structure, the coffer dam and the fuel tank are arranged in order from the top along a vertical direction perpendicular to the upper deck and such that at least part of the cabin structure, the coffer dam and the fuel tank are overlapping when viewed in the vertical direction,
wherein the fuel tank is generally centrally located in the hull along a longitudinal direction of the hull between front and back thereof.

2. The floating structure of claim 1, further comprising a barrier structure disposed between the coffer dam and the cabin structure such that the cabin structure, the barrier structure, the coffer dam and the fuel tank are arranged in order from the top along the vertical direction perpendicular to the upper deck.

3. The floating structure of claim 1, further comprising a machine room configured to process fuel stored in the fuel tank and disposed over the fuel tank, wherein the coffer dam is disposed between the machine room and the cabin structure such that the cabin structure, the coffer dam, the machine room and the fuel tank are arranged in order from the top along the vertical direction perpendicular to the upper deck.

4. The floating structure of claim 3, further comprising a barrier structure disposed between the coffer dam and the cabin structure such that the cabin structure, the barrier structure, the coffer dam, the machine room and the fuel tank are arranged in order from the top along the vertical direction perpendicular to the upper deck.

5. The floating structure of claim 3, wherein the fuel stored in the fuel tank is liquefied gas, and
wherein the machine room is provided with at least one of a re-condenser, a pump, a cooler, a vaporizer, and a boil off gas compressor to process the liquefied gas for use in a propulsion apparatus or a power generation apparatus.

6. The floating structure of claim 1, further comprising a propulsion apparatus and at least one conduit connecting between the fuel tank and the propulsion apparatus for supplying fuel from the fuel tank to the propulsion apparatus for consumption in the propulsion apparatus.

7. The floating structure of claim 6, wherein the propulsion apparatus comprises a high pressure gas injection engine or a low pressure gas injection engine for generating power and is configured to consume both fuel in a gaseous state and fuel in a liquid state.

8. The floating structure of claim 6, wherein the propulsion apparatus comprises a gas turbine.

9. The floating structure of claim 1, wherein the fuel tank is removable from the hull of the floating structure.

10. The floating structure of claim 7, further comprising another fuel tank containing at least one of heavy oil and diesel oil in a liquid state.

11. The floating structure of claim 1, wherein the floating structure is a ship comprising a propulsion apparatus.

12. The floating structure of claim 11, wherein the ship is a container ship.

13. A ship comprising:
a cabin structure disposed on an upper deck of the ship;
a fuel tank disposed in a hull of the ship below the upper deck and further under the cabin structure;
a coffer dam comprising a void space, which is disposed between the cabin structure and the fuel tank such that the cabin structure, the coffer dam and the fuel tank are arranged in order from the top along a vertical direction perpendicular to the upper deck and such that at least part of the cabin structure, the coffer dam and the fuel tank are overlapping when viewed in the vertical direction, wherein the fuel tank is generally centrally located in the hull along a longitudinal direction of the hull between front and back thereof;
a propulsion apparatus; and
at least one conduit connecting between the fuel tank and the propulsion apparatus for supplying fuel to from the fuel tank to the propulsion tank for consumption in the propulsion apparatus.

14. The floating structure of claim 1, wherein the fuel tank is configured to contain one selected from the group consisting of LPG, LNG, DME and CNG in a liquid state.

* * * * *